(12) United States Patent
McCaffrey

(10) Patent No.: US 9,970,310 B2
(45) Date of Patent: May 15, 2018

(54) SYSTEM AND METHOD FOR AN ASSEMBLED RING SHROUD

(71) Applicant: United Technologies Corporation, Hartford, CT (US)

(72) Inventor: Michael McCaffrey, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 285 days.

(21) Appl. No.: 15/003,349

(22) Filed: Jan. 21, 2016

(65) Prior Publication Data

US 2017/0211403 A1    Jul. 27, 2017

(51) Int. Cl.
*F01D 11/08* (2006.01)
*F01D 25/00* (2006.01)

(52) U.S. Cl.
CPC ............ *F01D 11/08* (2013.01); *F01D 25/005* (2013.01); *F05D 2220/32* (2013.01); *F05D 2240/11* (2013.01); *F05D 2240/12* (2013.01); *F05D 2240/30* (2013.01); *F05D 2300/6033* (2013.01); *F05D 2300/6034* (2013.01)

(58) Field of Classification Search
CPC .... F01D 11/08; F01D 25/005; F05D 2220/32; F05D 2240/11; F05D 2240/12; F05D 2240/30; F05D 2300/6033; F05D 2300/6034
See application file for complete search history.

(56) References Cited

U.S. PATENT DOCUMENTS

| 6,315,519 | B1 * | 11/2001 | Bagepalli | F01D 11/08 415/135 |
| 6,666,460 | B2 | 12/2003 | Diana | |
| 8,079,807 | B2 | 12/2011 | Shapiro et al. | |
| 8,568,091 | B2 | 10/2013 | McCaffrey | |
| 8,998,573 | B2 * | 4/2015 | Albers | F01D 11/005 415/139 |
| 2003/0202876 | A1 * | 10/2003 | Jasklowski | F01D 11/025 415/135 |
| 2004/0047726 | A1 * | 3/2004 | Morrison | F01D 9/04 415/116 |
| 2005/0220610 | A1 * | 10/2005 | Ghasripoor | F01D 5/225 415/173.3 |

(Continued)

FOREIGN PATENT DOCUMENTS

| EP | 2090754 | 8/2009 |
| GB | 2344140 | 5/2000 |

OTHER PUBLICATIONS

Extended European Search Report dated May 26, 2017 in European Application No. 17152265.9.

*Primary Examiner* — Igor Kershteyn
(74) *Attorney, Agent, or Firm* — Snell & Wilmer, L.L.P.

(57) ABSTRACT

An assembled ring shroud is provided. The assembled ring shroud may comprise a cover, a first ring layer, a key layer, and a second ring layer. The cover may operatively wrap around, contain, and secure the first ring layer, the key layer, and the second ring layer. The key layer may comprise a key that may act for position and anti-rotation. The key layer may comprise spacers to hold the keys in place. The first ring layer and the second ring layer may be configured to provide further strength and support to the assembled ring shroud.

20 Claims, 5 Drawing Sheets

(56) References Cited

U.S. PATENT DOCUMENTS

| | | | |
|---|---|---|---|
| 2007/0077141 A1* | 4/2007 | Keller | F01D 11/08 |
| | | | 415/136 |
| 2007/0258809 A1* | 11/2007 | Mazzola | F01D 11/08 |
| | | | 415/173.1 |
| 2008/0025838 A1* | 1/2008 | Marini | F01D 25/246 |
| | | | 415/173.4 |
| 2009/0208322 A1* | 8/2009 | McCaffrey | F01D 11/125 |
| | | | 415/113 |
| 2010/0104433 A1 | 4/2010 | Shi et al. | |
| 2014/0202168 A1 | 7/2014 | Shapiro et al. | |

* cited by examiner

SYSTEM AND METHOD FOR AN ASSEMBLED RING SHROUD

FIELD

The present disclosure relates to blade outer air seals of gas turbine engines, and more specifically, to an assembled ring shroud for gas turbine engines.

BACKGROUND

Gas turbine engines typically comprise a compressor section and a turbine section, with each section including rotatable blades and stationary vanes. Blade outer air seals may be mounted within the engine casing, positioned in close proximity to the outermost tips of the rotatable blades. Blade outer air seals may comprise a variety of materials, including unidirectional Ceramic Matrix Composite (CMC) plies. The exclusive use of unidirectional CMC plies may limit the way in which structural rings are created. A full hoop CMC ring for a blade outer air seal is particularly challenging for unidirectional plies because the outer plies are subjected to tensile stress. Historical data shows that the end ply contains stress concentrations and may limit the allowable stress significantly.

SUMMARY

In various embodiments, an assembled ring shroud is disclosed. The assembled ring shroud may have a circumferential axis. The assembled ring shroud may have a first ring layer aligned along the circumferential axis. The assembled ring shroud may have a key layer. The key layer may have a key and a spacer, may be located on the top of the first ring layer, and may be substantially aligned with the first ring layer and the circumferential axis. The assembled ring shroud may have a second ring layer. The second ring layer may be located on the top of the key layer, and may be substantially aligned with the key layer and the circumferential axis. The assembled ring shroud may have a cover. The cover may have a key slot configured to fit the key. The cover may be configured to wrap around and secure the first ring layer, the key layer and the second ring layer. The cover may be aligned along the circumferential axis.

In various embodiments, a gas turbine engine may comprise a blade stage. The gas turbine engine may also comprise an assembled ring shroud in the blade stage. The assembled ring shroud may have a circumferential axis. The assembled ring shroud may have a first ring layer aligned along the circumferential axis. The assembled ring shroud may have a key layer. The key layer may have a key and a spacer, may be located on the top of the first ring layer, and may be substantially aligned with the first ring layer and the circumferential axis. The assembled ring shroud may have a second ring layer. The second ring layer may be located on the top of the key layer, and may be substantially aligned with the key layer and the circumferential axis. The assembled ring shroud may have a cover. The cover may have a key slot configured to fit the key. The cover may be configured to wrap around and secure the first ring layer, the key layer and the second ring layer. The cover may be aligned along the circumferential axis.

In various embodiments, a gas turbine engine may have an engine case. The gas turbine engine may have a turbine stage comprising a stator vane and a rotor blade. The gas turbine engine may have an assembled ring shroud attached to the engine case. The assembled ring shroud may be facing the rotor blade to locally bind a radially outboard extreme of a core flow path through the gas turbine engine. The assembled ring shroud may have a circumferential axis. The assembled ring shroud may have a first ring layer aligned along the circumferential axis. The assembled ring shroud may have a key layer. The key layer may have a key and a spacer, may be located on the top of the first ring layer, and may be substantially aligned with the first ring layer and the circumferential axis. The assembled ring shroud may have a second ring layer. The second ring layer may be located on the top of the key layer, and may be substantially aligned with the key layer and the circumferential axis. The assembled ring shroud may have a cover. The cove may have a key slot configured to fit the key. The cover may be configured to wrap around and secure the first ring layer, the key layer and the second ring layer. The cover may be aligned along the circumferential axis.

In various embodiments, the first ring layer, the key of the key layer, the second ring layer, and the cover may be formed of a ceramic matrix composite (CMC) material. The CMC material forming the first ring layer may comprise unidirectionally aligned fibers oriented in a direction at least one of tangent or substantially tangent to the circumferential axis. The CMC material forming the second ring layer may comprise unidirectionally aligned fibers oriented in a direction at least one of tangent or substantially tangent to the circumferential axis. The CMC material forming the key of the key layer may comprise unidirectionally aligned fibers oriented in a direction perpendicular to the circumferential axis. The CMC material forming the cover may comprise unidirectionally aligned fibers oriented in a direction perpendicular to the circumferential axis. The spacer of the key layer may comprise a monolithic ceramic material.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
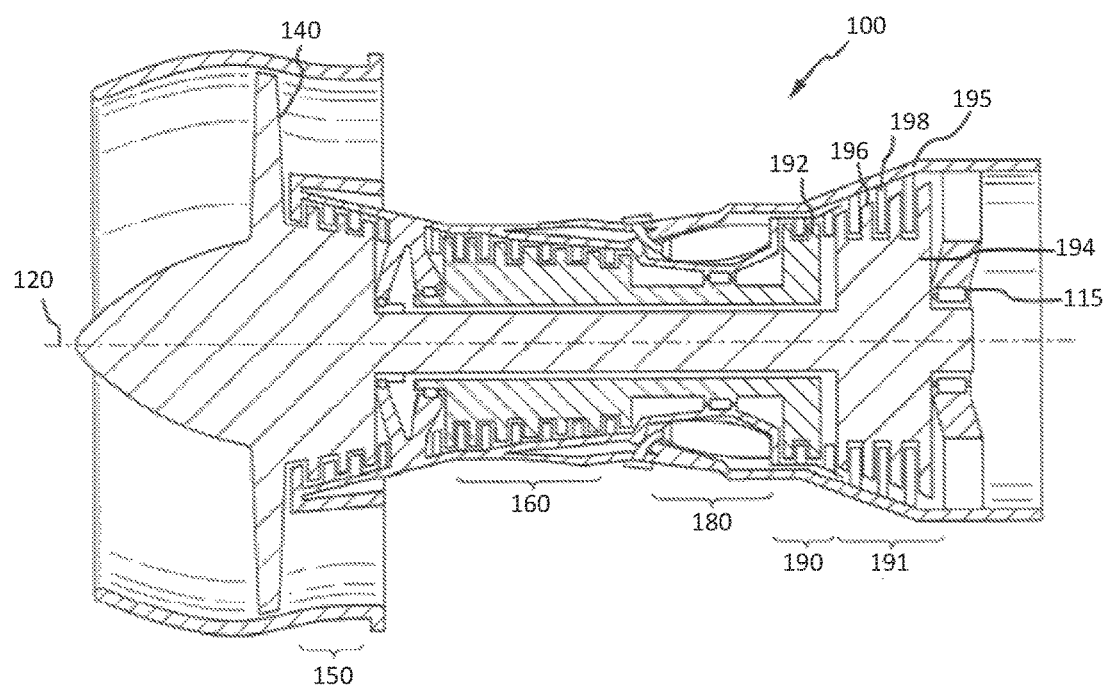
FIG. 1 illustrates a gas turbine engine, in accordance with various embodiments.

In various embodiments, and with reference to FIG. 1, a gas turbine engine 100 (such as a turbofan gas turbine engine) is illustrated. Gas turbine engine 100 is disposed about axial centerline axis 120, which may also be referred to as axis of rotation 120. Gas turbine engine 100 may comprise a fan 140, compressor sections 150 and 160, a combustion section 180, and turbine sections 190, 191. The fan 140 may drive air into compressor sections 150, 160, which may further drive air along a core flow path for compression and communication into the combustion section 180. Air compressed in the compressor sections 150, 160 may be mixed with fuel and burned in combustion section 180 and expanded across the turbine sections 190, 191. The turbine sections 190, 191 may include high pressure rotors 192 and low pressure rotors 194, which rotate in response to the expansion. The turbine sections 190, 191 may comprise alternating rows of rotary airfoils or blades 196 and static airfoils or vanes 198, housed within an engine casing 195. Cooling air may be supplied to the turbine sections 190, 191 from the compressor sections 150, 160. A plurality of bearings 115 may support spools in the gas turbine engine 100. FIG. 1 provides a general understanding of the sections in a gas turbine engine, and is not intended to limit the disclosure. The present disclosure may extend to all types of applications and to all types of turbine engines, including turbofan gas turbine engines and turbojet engines.

Figure 2:
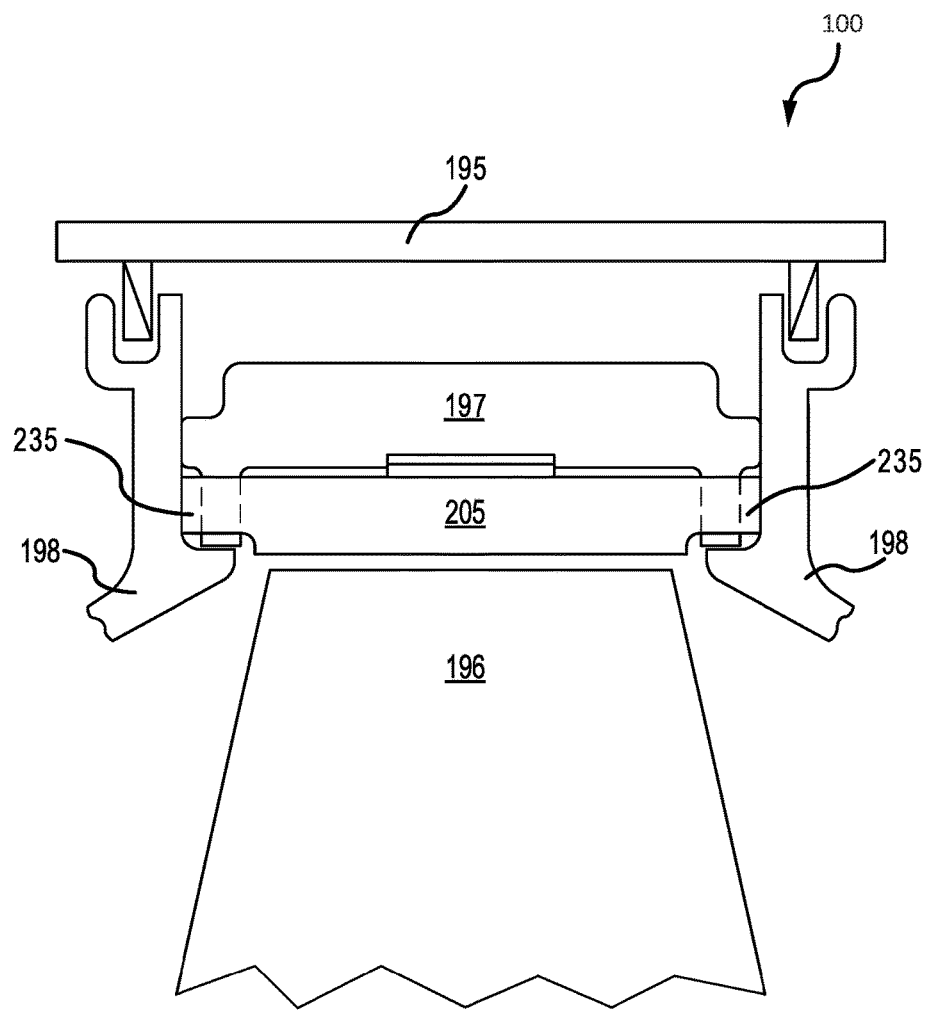
FIG. 2 illustrates a partially cut-away portion of the embodiment of FIG. 1, in accordance with various embodiments.

In various embodiments, and with reference to FIG. 2, a subsection of the gas turbine engine 100 is illustrated in greater detail. In this regard, FIG. 2 depicts a portion of blade 196 and a corresponding portion of an assembled ring shroud 205, located within engine casing 195. Assembled ring shroud 205 may be located between blade 196 and engine casing 195, and may be arranged circumferentially about axis of rotation 120. In this regard, assembled ring shroud 205 may comprise a single hoop, extending in a circumferential direction along the perimeter of engine casing 195. Assembled ring shroud 205 may couple within engine casing 195 at a mounting ring 197. Mounting ring 197 may be located circumferentially about axis of rotation 120, and may extend in a circumferential direction along the perimeter of engine casing 195. Mounting ring 197 may define an annular cavity configured to accept and secure assembled ring shroud 205. Assembled ring shroud 205 may be coupled to mounting ring 197 using any suitable method discussed in this disclosure or known in the art. FIG. 2 provides a general understanding of the location of an assembled ring shroud 205 and is not intended to limit the disclosure. Any suitable location for a blade outer air seal and any method of securing a blade outer air seal to a gas turbine engine known in the art are within the bounds of the present disclosure.

During engine operation, various areas of blade outer air seals may experience high stress and pressure. For example, blade outer air seals must withstand compressive hoop stress, i.e., the force exerted circumferentially on the blade outer air seals, and tensile stress, i.e., the stress state leading to radial expansion. Blade outer air seals may be made of a ceramic matrix composite (CMC) material, and typically may comprise a single-layered assembly. Blade outer air seals may comprise unidirectional fiber reinforced CMC materials.

In a CMC material having unidirectional fibers, all of the fibers may be oriented in a similar parallel orientation. For example, in a 0° orientation, all of the fibers are oriented in a parallel orientation along a 0° axial direction. Similarly, in a 90° orientation, all of the fibers are unidirectionally oriented in a parallel orientation along a 90° axial direction. Unidirectional fiber materials may allow the ability to place the fibers in the component exactly where it is required and in the optimum quantity needed. Unidirectional fiber materials may comprise very good tensile strength properties in the direction of the fiber orientation, but weak in the direction perpendicular to the fiber orientation.

Problems may arise in the selection of the fiber orientation of the CMC material. Unidirectional material may be very strong in response to being pulled and/or subjected to stress in the direction of the fibers, but it may be weak in response to being pulled and/or subject to stress in a direction perpendicular to the fibers. Therefore, if all of the fibers are only oriented in a single direction, the material may be weak to stresses perpendicular to that single direction. If the fibers are woven, then the joint where the woven fibers meet may create an area of localized weakness. Thus, it may be desirable to create a blade outer air seal comprising a layup structure that has relative strength against both compressive hoop stress and tensile stress.

Figure 3A:
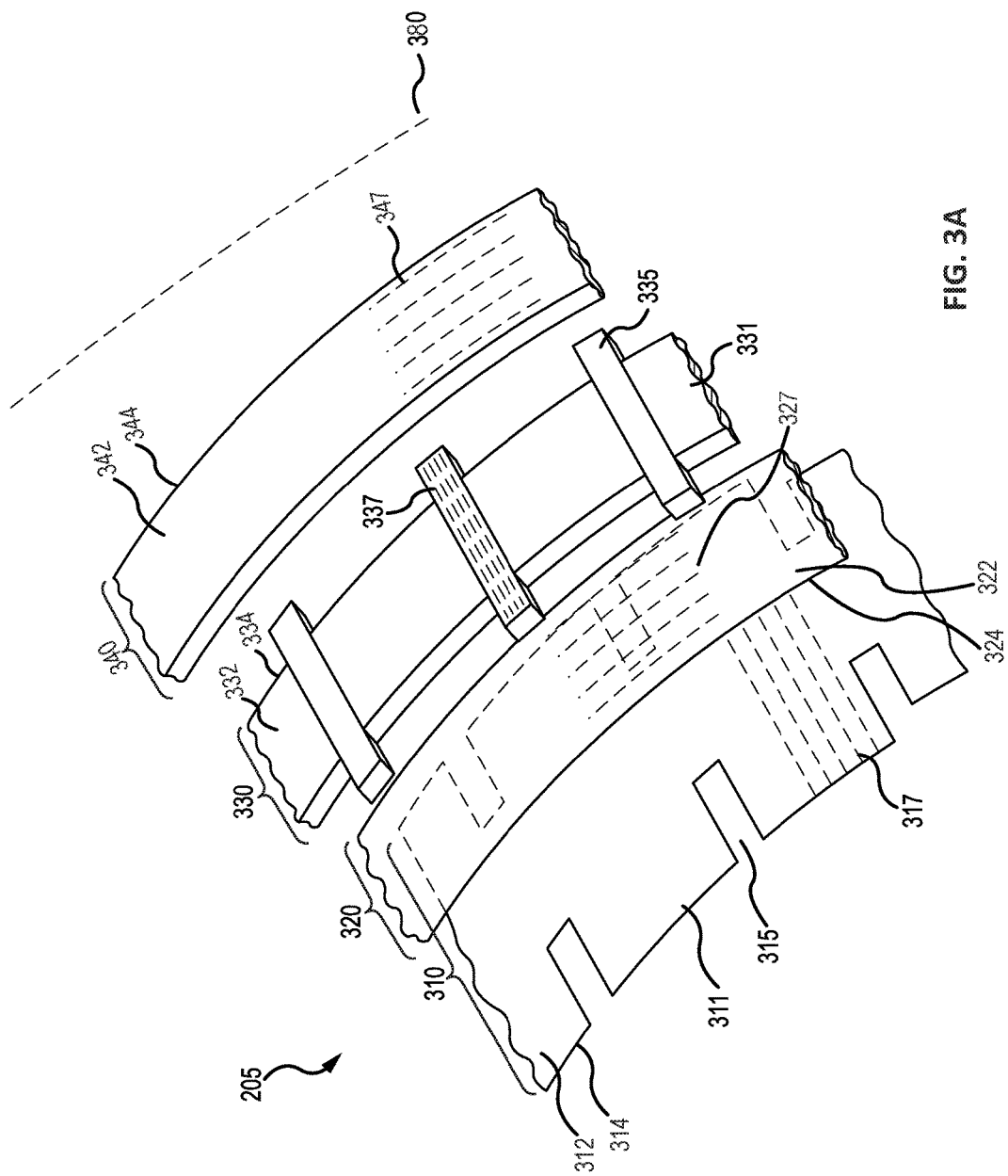
FIG. 3A illustrates an exploded perspective view of an assembled ring shroud, in accordance with various embodiments.
Figure 3B:
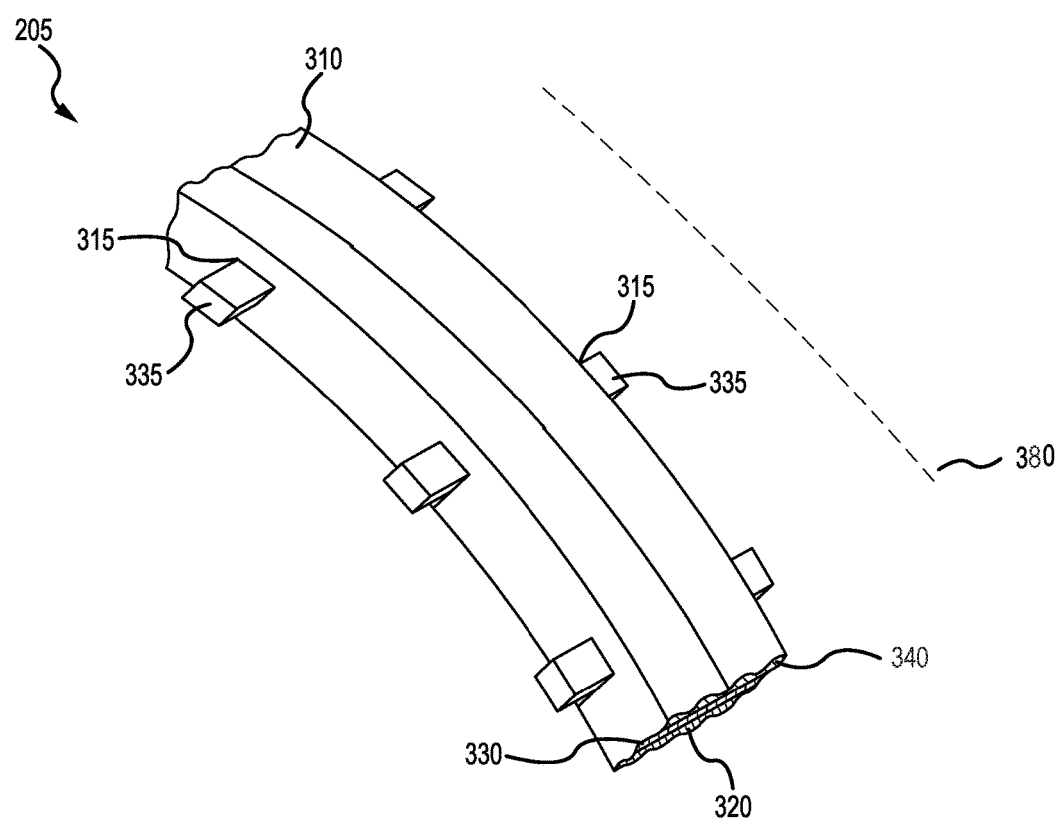
FIG. 3B illustrates a perspective view of an assembled ring shroud, in accordance with various embodiments.
Figure 3C:
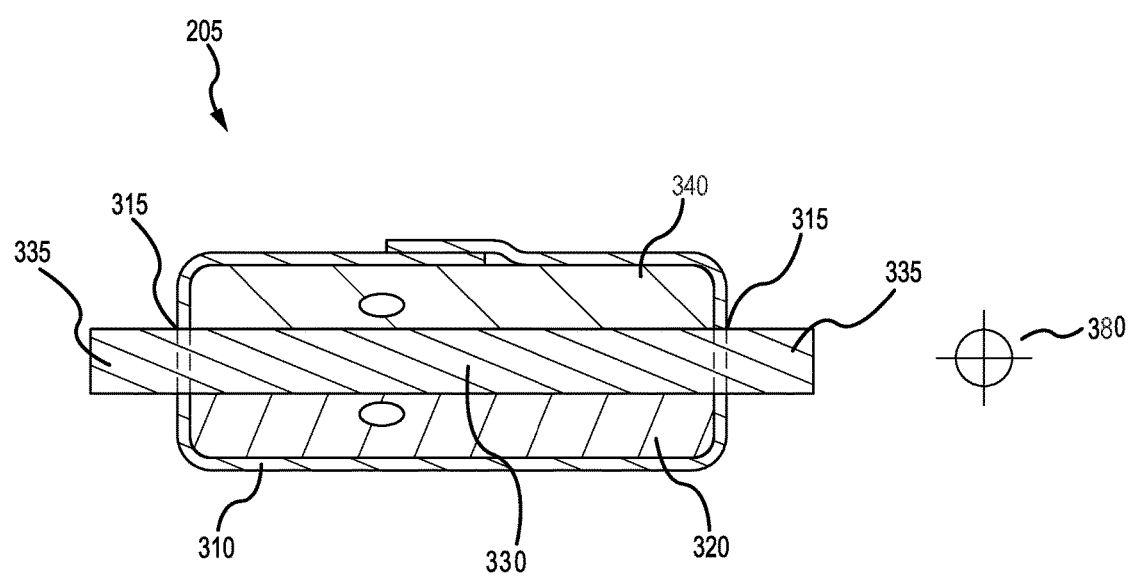
FIG. 3C illustrates a front view of an assembled ring shroud, in accordance with various embodiments.

In various embodiments, and with reference to FIGS. 3A, 3B, and 3C, an assembled ring shroud 205 is disclosed. FIGS. 3A, 3B, and 3C depict a portion of a full hoop ring assembled ring shroud 205. A depiction of assembled ring shroud 205 as a full hoop ring has been omitted for simplicity. Assembled ring shroud 205 may have any suitable shape, such as, for example, an annular shape. Assembled ring shroud 205 may be made of any suitable material providing high temperature stability and enhanced strength. For example, assembled ring shroud 205 may comprise a CMC material, and/or any other suitable material. Assembled ring shroud 205 may be configured as a layup assembly, wherein the assembled multi-piece structure exhibits characteristics desirable in a blade outer air seal. In this regard, assembled ring shroud 205 may comprise multiple layers, with each layer having a different unidirectional fiber orientation. By providing multiple layers comprising different unidirectional fiber orientations, the various embodiments of the present disclosure may enable the creation of assembled ring shroud 205 having a higher fiber density (i.e., a higher volume of unidirectional fibers in the CMC material).

CMC materials comprised of layers of aligned unidirectional fibers may be twice as strong when compared to CMC materials comprised of layers of woven cloth. The strength increase is well known both in CMC materials and in lower temperature Polymer Matric Composites, such as in resin-carbon fiber laminates. Aligning the fibers in one direction may increase the fiber density in that direction, increasing the capability of the CMC material to resist tensile and bending stress. The increase in resistance to tensile and bending stress may result from the elimination of the fiber tows that are perpendicular to the load. Fiber tows perpendicular to the load may be unable to resist the tensile stress because the individual fibers within the two can pull away from the other fibers with the two due to the weak interface layer covering the individual fibers within the tow. Moreover, the elimination of the voids within the matrix and the internal stress concentrations arising from the bending of the fibers as the fibers cross over and under the perpendicular fibers may further improve the strength of the tensile loaded fibers. For these reasons, CMC structures and sub-components made from unidirectional fibers may be twice as strong as conventional woven CMC materials in resistance to tensile and bending stresses. Additionally, sub-components, such as key 335, may be used in a shear application, wherein the shear load may be transmitted along the sub-component, resulting in a sub-component that may be twice as strong as a sub-component made from a woven CMC laminate.

In various embodiments, assembled ring shroud 205 may comprise a first ring layer 320, a key layer 330, a second ring layer 340, and/or a cover 310. Assembled ring shroud 205 may be disposed along a circumferential axis 380. Circumferential axis 380 may define a direction at least one of circumferential or substantially circumferential about axis of rotation 120 (FIG. 1). In this regard, circumferential axis 380 may define a circumferential direction around the cylindrical surface of engine casing 195 (FIG. 1). Assembled ring shroud 205 may therefore be disposed in a circumferential direction about axis of rotation 120 (FIG. 1).

In various embodiments, cover 310 may be located radially outward from first ring layer 320, key layer 330, and second ring layer 340, along circumferential axis 380. First ring layer 320, key layer 330, and second ring layer 340 may be arranged in any desired and/or suitable order radially inward from cover. For example, assembled ring shroud 205 may comprise a layup configuration wherein first ring layer 320 may be coupled to the inside 312 of cover 310, key layer 330 may be coupled to the top 322 of first ring layer 320, and second ring layer 340 may be coupled to the top 332 of key layer 330. Cover 310 may then comprise a radially outward layer (to circumferential axis 380) of assembled ring shroud 205, with the inside 312 of cover 310 in contact with, and wrapped around, first ring layer 320, key layer 330, and second ring layer 340.

In various embodiments, first ring layer 320 may be configured to provide further strength and support for assembled ring shroud 205. First ring layer 320 may comprise a top 322 and a bottom 324. First ring layer 320 may be configured to couple to cover 310 at the bottom 324 of first ring layer 320. First ring layer 320 may be configured to couple to key layer 330 at the top 322 of first ring layer 320. First ring layer 320 may comprise any suitable shape and/or size, such as, for example an annular shape. First ring layer 320 may comprise a similar length and width to key layer 330 and second ring layer 340, such that all three layers may align or substantially align along circumferential axis 380 in assembled ring shroud 205, when mounted in a gas turbine engine.

In various embodiments, first ring layer 320 may comprise any suitable material providing enhanced strength and support. For example, first ring layer 320 may comprise a CMC material. First ring layer 320 may comprise a CMC material comprised of unidirectional fibers. First ring layer 320 may comprise unidirectional fibers oriented in a fiber orientation 327. Fiber orientation 327, depicted as dashed lines in FIG. 3A, may be oriented in a direction at least one of tangent or substantially tangent to circumferential axis 380. "Tangent," as used herein, may refer to a direction that is aligned to circumferential axis 380 along the cylindrical surface of engine casing 195. The term "substantially" in this context, and used herein, may refer to a +/−5° tolerance from tangent. In this regard, unidirectional fibers oriented in a circumferential direction (here, substantially tangent to circumferential axis 380) may enable high strength along the circumferential direction in first ring layer 320. The use of unidirectional fibers oriented in fiber orientation 327 may therefore enable first ring layer 320 to provide further support along the circumferential direction and strength in response to hoop stress to assembled ring shroud 205.

In various embodiments, second ring layer 340 may be configured to provide further support for assembled ring shroud 205. Second ring layer 340 may comprise a top 342 and a bottom 344. Second ring layer 340 may be configured to couple to key layer 330 at the bottom 344 of second ring layer 340. Second ring layer 340 may be configured to couple to cover 310 at the top 342 of second ring layer 340. Second ring layer 340 may comprise the same general attributes as first ring layer 320. In this regard, second ring layer 340 may comprise any suitable shape and/or size, such as, for example an annular shape. Second ring layer 340 may comprise a similar length and width to key layer 330 and first ring layer 320, such that all three layers may substantially align along circumferential axis 380 in assembled ring shroud 205, when mounted in a gas turbine engine.

In various embodiments, second ring layer 340 may comprise any suitable material providing enhanced strength and support. For example, second ring layer 340 may comprise a CMC material. Second ring layer 340 may comprise a CMC material comprised of unidirectional fibers. Second ring layer 340 may comprise unidirectional fibers oriented in a fiber orientation 347. Fiber orientation 347, depicted as dashed lines in FIG. 3A, may be oriented in a direction substantially tangent to circumferential axis 380. In this regard, unidirectional fibers oriented in a circumferential direction (here, substantially tangent to circumferential axis 380) may enable high strength in the circumferential direction in second ring layer 340. The use of unidirectional fibers oriented in fiber orientation 347 may therefore enable second ring layer 340 to provide further support along the circumferential direction, and strength in response to hoop stress to assembled ring shroud 205.

In various embodiments, key layer 330 may be configured to provide anti-rotation features in assembled ring shroud 205. Key layer 330 may also be configured as a mechanism for securing assembled ring shroud 205 to a gas turbine engine. Key layer 330 may comprise a top 332 and a bottom 334. Key layer 330 may be configured to couple to first ring layer 320 at the bottom 334 of key layer 330. Key layer 330 may be configured to couple to second ring layer 340 at the top 332 of key layer 330. In various embodiments, key layer 330 may comprise a plurality of keys 335 and spacers 331. The plurality of keys 335 and spacers 313 may be evenly spaced throughout key layer 330, such that keys 335 may correspond to, and align with, key slots 315 of cover 310.

In various embodiments, key 335 may be configured to provide anti-rotation features and to secure assembled ring shroud 205 to the gas turbine engine. With reference again to FIG. 2, key 335 may be configured to engage a slot 235 in mounting ring 197. When a plurality of keys 335 are engaged in a plurality of slots 235, assembled ring shroud 205 may be operatively coupled within gas turbine engine 100. Moreover, the connection between key 335 and slot 235 may provide anti-rotation properties. For example, as assembled ring shroud 205 grows radially and contracts, due to pressures, temperatures, and other stresses, the key 335 to slot 235 connection keeps assembled ring shroud 205 centered within gas turbine engine 100.

In various embodiments, key 335 may comprise any suitable material. For example, key 335 may comprise a CMC material. Key 335 may comprise a CMC material comprised of unidirectional fibers. Key 335 may comprise unidirectional fibers oriented in a fiber orientation 337. Fiber orientation 337, depicted as dashed lines in FIG. 3A, may be oriented in an axial direction to axis of rotation 105, and perpendicular to circumferential axis 380. Aligning the unidirectional fibers with one another in fiber orientation 337 may provide key 335 with high shear strength in a direction perpendicular to fiber orientation 337.

In various embodiments, spacer 331 may be configured to provide a discrete distance between each individual key 335. In this regard, spacer 313 may be used to align key 335 with key slot 315 in assembled ring shroud 205. Spacer 313 may therefore be any shape and/or size suitable to ensure correct spacing between keys 335. Spacer 313 may comprise any suitable material. For example, spacer 313 may comprise a CMC material. Spacer 313 may also comprise unidirectional fibers oriented in any direction, woven fibers, a monolithic ceramic, and/or any other suitable material.

In various embodiments, cover 310 may be configured to provide support to assembled ring shroud 205, and to keep first ring layer 320, key layer 330, and second ring layer 340 from separating and/or delaminating. Cover 310 may comprise an inside 312 and an outside 314. Cover 310 may comprise the radially outward layer of assembled ring shroud 205 (radially outward from circumferential axis 380), and may be configured to wrap around first ring layer 320, key layer 330, and second ring layer 340, in order to secure the layers, and keep the layers from delaminating. In this regard, the inside 312 of cover 310 may be configured to couple to the bottom 324 of first ring layer 320 and the top 344 of second ring layer 340. The outside 314 of cover 310 may then comprise the radially outward (from circumferential axis 380) layer of assembled ring shroud 205.

In various embodiments, cover 310 may be made of any material suitable to provide structural support for first ring layer 320, key layer 330, and second ring layer 340. For example, cover 310 may comprise a CMC material. Cover 310 may comprise a CMC material comprised of unidirectional fibers. The unidirectional fibers may be oriented in any suitable direction. For example, cover 310 may comprise unidirectional fibers oriented in a fiber orientation 317. Fiber orientation 317, depicted as dashed lines in FIG. 3A, may be oriented in an axial direction to axis of rotation 120, and perpendicular to circumferential axis 380. Fiber orientation 317 may function to allow cover 310 to have the flexibility to wrap around first ring layer 320, key layer 330, and second ring layer 340, such that cover 310 may comprise a complete layer radially outward from circumferential axis 380. In this regard, fiber orientation 317 may direct the unidirectional fibers to wrap around assembled ring shroud 205, increasing the ability of cover 310 to tightly secure first ring layer 320, key layer 330, and second ring layer 340 together.

In various embodiments, cover 310 may comprise a plurality of key slots 315 and a plurality of ridges 311 along the edges of cover 310. Key slot 315 may comprise a void extending inward from the edge of cover 310. Key slot 315 may be configured to operatively fit key 335 within assembled ring shroud 205. Key slot 315 may comprise any shape suitable to fit key 335. For example, and in various embodiments, key slot 315 may comprise a square and/or rectangular shaped void. Key slot 315 may also comprise a thin slit void, wherein the unidirectional fibers of cover 310 may stretch apart to operatively fit key 335.

In various embodiments, ridge 311 may define an edge of cover 310 located in-between each key slot 315. Ridge 311 may be configured to function as a mating edge for cover 310. In this regard, ridge 311 may operatively couple to a ridge on the opposite edge of cover 310. The two ridges 311 may operatively couple together such that cover 310 tightly and securely wraps around first ring layer 320, key layer 330, and second ring layer 340 (FIG. 3C provides an example of a fully assembled, assembled ring shroud 205). The two ridges 311 may operatively couple to each other using any suitable method known in the art. For example, the two ridges 311 may be sewn together. The two ridges 311 may also be operatively coupled through the use of an adhesive and/or through any other suitable chemical means. In various embodiments, the two ridges 311 may couple to each other to produce an overlap, wherein a first ridge 311 is coupled to the top of a second ridge 311. An overlap may increase the surface contact area (shear across the matrix bond line) of unidirectional plies. The increase in surface contact area may help to reduce the risk of delamination in assembled ring shroud 205.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An assembled ring shroud having a circumferential axis, comprising:
   a first ring layer having a top and a bottom, wherein the first ring layer is aligned in a direction at least one of tangent or substantially tangent to the circumferential axis;
   a key layer having a key and a spacer and a top and a bottom, wherein the bottom of the key layer is coupled to the top of the first ring layer, and wherein the key layer is aligned in the direction at least one of tangent or substantially tangent to the circumferential axis;
   a second ring layer having a top and a bottom, wherein the bottom of the second ring layer is coupled to the top of the key layer, and wherein the ring layer is aligned in the direction at least one of tangent or substantially tangent to the circumferential axis; and
   a cover having a key slot, wherein the cover is configured to wrap around and secure the first ring layer, the key layer, and the second ring layer, and is aligned in the direction at least one of tangent or substantially tangent to the circumferential axis, and wherein the key slot comprises a void on an edge of cover, and is configured to fit the key.

2. The assembled ring shroud of claim 1, wherein the first ring layer, the key of the key layer, the second ring layer, and the cover are formed of a ceramic matrix composite (CMC) material.

3. The assembled ring shroud of claim 2, wherein the CMC material forming the first ring layer comprises unidirectionally aligned fibers oriented in a direction at least one of tangent or substantially tangent to the circumferential axis.

4. The assembled ring shroud of claim 2, wherein the CMC material forming the second ring layer comprises unidirectionally aligned fibers oriented in a direction at least one of tangent or substantially tangent to the circumferential axis.

5. The assembled ring shroud of claim 2, wherein the CMC material forming the key of the key layer comprises unidirectionally aligned fibers oriented in a direction at least one of perpendicular or substantially perpendicular to the circumferential axis.

6. The assembled ring shroud of claim 2, wherein the CMC material forming the cover comprises unidirectionally aligned fibers oriented in a direction at least one of perpendicular or substantially perpendicular to the circumferential axis.

7. The assembled ring shroud of claim 1, wherein the spacer of the key layer comprises a monolithic ceramic material.

8. A gas turbine engine comprising:
   a blade stage; and
   an assembled ring shroud in the blade stage, the assembled ring shroud having a circumferential axis, comprising:
     a first ring layer having a top and a bottom, wherein the first ring layer is aligned in a direction at least one of tangent or substantially tangent to the circumferential axis;
     a key layer having a key and a spacer and a top and a bottom, wherein the bottom of the key layer is coupled to the top of the first ring layer, and wherein the key layer is aligned in the direction at least one of tangent or substantially tangent to the circumferential axis;
     a second ring layer having a top and a bottom, wherein the bottom of the second ring layer is coupled to the top of the key layer, and wherein the ring layer is aligned in the direction at least one of tangent or substantially tangent to the circumferential axis; and
     a cover having a key slot, wherein the cover is configured to wrap around and secure the first ring layer, the key layer, and the second ring layer, and is aligned in the direction at least one of tangent or substantially tangent to the circumferential axis, and wherein the key slot comprises a void on an edge of cover, and is configured to fit the key.

9. The gas turbine engine of claim 8, wherein the first ring layer, the key of the key layer, the second ring layer, and the cover are formed of a ceramic matrix composite (CMC) material.

10. The gas turbine engine of claim 9, wherein the CMC material forming the first ring layer comprises unidirectionally aligned fibers oriented in a direction at least one of tangent or substantially tangent to the circumferential axis.

11. The gas turbine engine of claim 9, wherein the CMC material forming the second ring layer comprises unidirectionally aligned fibers oriented in a direction at least one of tangent or substantially tangent to the circumferential axis.

12. The gas turbine engine of claim 9, wherein the CMC material forming the key of the key layer comprises unidirectionally aligned fibers oriented in a direction at least one of perpendicular or substantially perpendicular to the circumferential axis.

13. The gas turbine engine of claim 9, wherein the CMC material forming the cover comprises unidirectionally aligned fibers oriented in a direction at least one of perpendicular or substantially perpendicular to the circumferential axis.

14. The gas turbine engine of claim 8, wherein the spacer of the key layer comprises a monolithic ceramic material.

15. A gas turbine engine comprising:
   an engine case;
   a turbine stage comprising a stator vane and a rotor blade; and an assembled ring shroud attached to the engine case and facing the rotor blade to locally bind a radially outboard extreme of a core flow path through the gas turbine engine, the assembled ring shroud having a circumferential axis, comprising:
- a first ring layer having a top and a bottom, wherein the first ring layer is aligned in a direction at least one of tangent or substantially tangent to the circumferential axis;
- a key layer having a key and a spacer and a top and a bottom, wherein the bottom of the key layer is coupled to the top of the first ring layer, and wherein the key layer is aligned in the direction at least one of tangent or substantially tangent to the circumferential axis;
- a second ring layer having a top and a bottom, wherein the bottom of the second ring layer is coupled to the top of the key layer, and wherein the ring layer is aligned in the direction at least one of tangent or substantially tangent to the circumferential axis; and
- a cover having a key slot, wherein the cover is configured to wrap around and secure the first ring layer, the key layer, and the second ring layer, and is aligned in the direction at least one of tangent or substantially tangent to the circumferential axis, and wherein the key slot comprises a void on an edge of cover, and is configured to fit the key.

16. The gas turbine engine of claim 15, wherein the first ring layer, the key of the key layer, the second ring layer, and the cover are formed of a ceramic matrix composite (CMC) material.

17. The gas turbine engine of claim 16, wherein the CMC material forming the first ring layer comprises unidirectionally aligned fibers oriented in a direction at least one of tangent or substantially tangent to the circumferential axis.

18. The gas turbine engine of claim 16, wherein the CMC material forming the second ring layer comprises unidirectionally aligned fibers oriented in a direction at least one of tangent or substantially tangent to the circumferential axis.

19. The gas turbine engine of claim 16, wherein the CMC material forming the key of the key layer comprises unidirectionally aligned fibers oriented in a direction at least one of perpendicular or substantially perpendicular to the circumferential axis.

20. The gas turbine engine of claim 16, wherein the CMC material forming the cover comprises unidirectionally aligned fibers oriented in a direction at least one of perpendicular or substantially perpendicular to the circumferential axis.

* * * * *